United States Patent Office 3,454,653
Patented July 8, 1969

3,454,653
PURIFICATION OF PHENOLS
John Eric Larson, Norton-on-Tees, England, assignor to Imperial Chemical Industries Limited, London, England, a corporation of Great Britain
No Drawing. Filed Nov. 16, 1966, Ser. No. 594,683
Claims priority, application Great Britain, Nov. 26, 1965, 50,342/65
Int. Cl. C07c 39/04, 39/22, 7/00
U.S. Cl. 260—621                                         4 Claims

ABSTRACT OF THE DISCLOSURE

There is provided a process for the purification of phenol derived from cumene which has at least one impurity of carbonyls, mesityl oxide, benzofurans and precursors thereof. The phenol is first distilled to remove the low and high boiling materials. The refined phenol is then contacted at temperatures between 180 and 260° C. with a synthetic silica-alumina catalyst having 5 to 30% by weight of alumina and 95 to 70% by weight of silica and a pore volume of within the range of 0.3 to 0.8 cc. per gram. The phenol which is contacted with the catalyst must contain less than 1% by weight of water. The purified phenol is then separated from the catalyst, for example, by distillation. The synthetic silica-alumina catalyst is highly active as a hydrocarbon cracking catalyst and may be prepared by calcining a silica-alumina gel. Preferably the catalyst also contains from 0.01 to 5% by weight of a Group VI metal oxide.

---

This invention relates to the purification of phenol and in particular to the purification of phenol derived from cumene.

It is known to produce phenol from cumene by a process comprising the steps of oxidising the cumene to cumene hydroperoxide, decomposing the hydroperoxide to phenol and acetone and separating the phenol so formedt from unreacted cumene, acetone and by-products of the process.

However, the phenol produced by this known process may contain impurities difficult to remove by conventional procedures, for example, distillation, which decrease the commercial value of the phenol. Thus, the phenol may contain impurities such as benzofurans which when the phenol is subjected to chlorination or sulphonation, give rise to the formation of undesirable coloured products. Further, the phenol may have poor colour stability that is, on storage, the phenol may become more deeply coloured.

We have found that mesityl oxide and other carbonyl compounds, benzofurans and substances which condense with phenol to give benzofurans may be very effectively removed from phenol by bringing the phenol into contact with a particular catalyst under particular conditions and that the phenol thus purified has good storage properties.

Thus, according to the invention there is provided a process for the purification of phenol derived from cumene in which the phenol is brought into contact at elevated temperature with a silica-alumnia catalyst under substantially anhydrous conditions.

Throughout this specification by "substantially anhydrous conditions" is meant that not more than 1% by volume of water is present in the phenol. It is preferred that the phenol is as nearly anhydrous as possible and contains not more than 0.1% by volume of water.

The use of substantially anhydrous conditions enables mesityl oxide, higher molecular weight carbonyl compounds and 2-methyl benzofuran to be more effectively removed than is the case under wet conditions. Further, there is a lesser formation of coloured compounds while the phenol after subsequent distillation has a paler colour and a better colour stability.

It is preferred to use a synthetic silica-alumina catalyst and which preferably contains 5% to 30% by weight of alumina and 95% to 70% by weight of silica, especially about 10% by weight of alumina and about 90% by weight of silica.

It is preferred that the pore volume of the catalyst is within the range of 0.3 to 0.8 cc. per gram. Pore volume is determined by the following method which is applied to catalyst which has been degassed at room temperature for 30 minutes at a pressure not exceeding $10^{-3}$ mm.:

(1) The density of the catalyst immersed in mercury at 20° C. and 900 mm. pressure is determined after allowing about 15 minutes for attainment of equilibrium: this is the average density of solid containing pores not penetrated by mercury, that is pores of radius smaller than about $6 \times 10^{-4}$ angstrom units;

(2) The density of the catalyst immersed in helium at room temperature is determined: this is the true density of the ultimate solid material;

(3) The reciprocal of the density in helium is subtracted from the reciprocal of the density in mercury: the difference is equal to the total pore volume per gram of catalyst.

The surface area of the catalyst may suitably be within the range 100 to 500 square meters per gram. The surface area per gram of the catalyst is determined by the method of Brunauer, Emmett and Teller by measuring the quantity of argon adsorbed on the catalyst at −183° C.: in calculating the surface area the cross-sectional area of the argon atom is taken as 14.4 square angstrom units.

The catalyst may be prepared by calcining a silica-alumina gel.

The silica-alumina catalyst may be advantageously modified by incorporating therein a metal of Group VIA of the Periodic Classification i.e., chromium, molybdenum or tungsten, preferably chromium. The amount of the Group IVA metal is preferably within the range 0.01 to 5%, very suitably 0.3% by weight of the catalyst. The presence of a Group VIA metal facilitates the removal of 2-methylbenzofurans.

The proportions of catalyst to phenol is not in itself critical provided that efficient contact between the catalyst and phenol is obtained.

While the process of the invention may be carried out with the phenol at least in part in the vapour phase it is very suitably carried out in the liquid phase and pressure may be applied to maintain liquid phase conditions.

The elevated temperature at which the process is carried out should not be so high that substantial decomposition of the phenol occurs. Suitable temperatures are those not exceeding 300° C. While mesityl oxide and higher carbonyl compounds may be effectively removed from phenol at temperatures down to about 120° C. it is preferred for effective removal of 2-methylbenzofuran that the temperature is not below 150° C. Preferably the temperature is within the range 180° to 260° C.

While the process of the invention is applicable to the purification of crude phenol it is particularly applicable to the purification of refined or partly refined phenol i.e., phenol from which hydrocarbons such as cumene and α-methyl styrene, and high boiling material have been removed or from which lower and higher boiling materials have been removed by distillation.

The period during which the phenol is maintained in contact with the catalyst depends on the amount of impurities in the phenol and the degree of purity required in the finished product. We have found that contact times of up to 10 hours, particularly within the range 4 to 8 hours, are suitable and that the longer contact times lead to more effective removal of 2-methylbenzofuran although the removal of mesityl oxide and higher molecular weight carbonyl compounds is not so sensitive to contact time.

After treatment with the silica-alumina catalyst for the required contact time the phenol may be separated from the catalyst by any suitable method for example, distillation. It is usually advantageous to fractionally distil the phenol after the treatment with silica-alumina is completed and this distillation may be effected in the presence of water or steam.

The process of the invention may be carried out batchwise or continuously.

The invention is illustrated by the following examples in which the chlorination colour index is determined by treating 10 gram phenol with gaseous chlorine at 80° C. until the weight of the phenol has increased by 5.5 to 6.0 gram and measuring the optical density of the product at 540 m$\mu$ in a spectrophotometer using a 1 cm. glass or silica cell; sulphonation colour is determined by stirring 10 g. phenol with 3 ml. concentrated sulphuric acid at 150° C. for 5 minutes, cooling the mixture rapidly to 60° C., diluting with 25 ml. glacial acetic acid and measuring absorbance at 490 m$\mu$ in a spectrophotometer using a 1 cm. cell; "p.p.m." means parts per million; "L.S.V." means liquid space velocity in litres per litre of catalyst filled space per hour and 2MBF means 2-methylbenzofuran.

EXAMPLE 1

250 grams of a refined phenol derived from cumene, having a chlorination colour index of 20.8 units and containing 440 parts per million of 2-methylbenzofuran, were gently refluxed for 5 hours under atmospheric pressure with 250 mls. of a silica-alumina cracking catalyst containing 10% by weight of alumina and having a surface area of 330 square metres per gram and a pore volume of 0.4 cc. per gram. After separating the catalyst the phenol was subjected to side-arm distillation and the distillate was found to have a chlorination colour index of 5 units and a 2-methylbenzofuran content of 126 p.p.m.

EXAMPLE 2

The experiment described in Example 1 was repeated under the same conditions except that the silica-alumina catalyst contained 0.2% by weight of chromium sesquioxide. The product phenol had a chlorination colour index of 2.4 units and a 2-methylbenzofuran content of 45 p.p.m.

EXAMPLE 3

500 ml. of a silica-alumina catalyst containing 0.2% by weight of chromium sesquioxide and having a surface area of 330 square metres per gram and a pore volume of 0.4 cc. per gram were packed into a one inch internal diameter stainless steel tube. The refined phenol used in Example 1 was passed under a pressure of 60 lb. per square inch gauge at a rate of 125 mls. per hour through the catalyst at a temperature of 200° C. The product phenol after side-arm distillation had a chlorination colour index of 2.3 units and a 2-methylbenzofuran content of 45 p.p.m.

When the conditions were altered to a phenol rate of 62 mls. per hour, a temperature of 250° C. and a pressure of 90 lb. per square inch gauge the distilled product phenol had a chlorination colour index of 0.56 unit and its 2-methylbenzofuran content was less than 5 parts per million.

EXAMPLE 4

The following experiments illustrate the adverse effect of water on the purification of phenol derived from cumene.

A reactor was used which consisted of a stainless steel tube 48 inches long and 1.75 inches internal diameter packed with a 20 inch long zone of 0.25 inch porcelain rings, followed by 14 inches of a synthetic silica-alumina catalyst (90% silica/10% alumina; surface area 182 m.$^2$/g.; pore volume 0.38 cc./g.) and finally 14 inches of porcelain rings.

A refined phenol containing less than 5, 215, 114 and 200 p.p.m. of acetone, mesityl oxide, 2-methylbenzofuran and other carbonyl compounds i.e. excluding acetone and mesityl oxide, respectively, was passed continuously through the reactor under a pressure of 120 p.s.i.g. and under other conditions as stated in the following table. Two series of experiments were performed. In Series I the phenol was anhydrous while in Series II it contained 3% by weight added water.

Acetone, mesityl oxide and 2-methylbenzofuran were determined by gas/liquid chromatography while the total carbonyl content was determined as the phenyl hydrazone.

Product Analysis, p.p.m. weight/weight

| Temp., °C. | L.S.V., hr.$^{-1}$ | Acetone | Mesityl oxide | 2-MBF | Other carbonyls |
|---|---|---|---|---|---|
| Series I: | | | | | |
| 210 | 0.2 | <5 | <5 | 50 | 63 |
| 210 | 0.5 | <5 | <5 | 60 | 75 |
| 240 | 0.2 | <5 | <5 | 40 | 88 |
| 240 | 0.5 | <5 | <5 | 57 | 93 |
| Series II: | | | | | |
| 210 | 0.2 | 100 | <5 | 102 | 85 |
| 210 | 0.5 | 124 | <5 | 90 | 119 |
| 240 | 0.2 | 31 | <5 | 90 | 10 |
| 240 | 0.5 | 77 | <5 | 110 | 85 |

The results obtained in the above experiments show more effective removal of 2-methylbenzofuran and in general, more effective removal of "other carbonyl compounds" under anhydrous conditions. Further under anhydrous conditions there is no increase in the acetone content of the phenol.

EXAMPLE 5

The experiments described below provide further confirmation of the adverse effect of water on the purification of phenol derived from cumene.

A refined phenol was passed through a reactor packed with a synthetic silica-alumina catalyst (90% silica/10% alumina; surface area 182 m.$^2$/g.; pore volume 0.38 cc./g.) at a liquid space velocity of 0.45 hr.$^{-1}$ and a temperature of 200° C. In experiment 1, 1.6% by weight of water was added to the phenol while in experiment 2 the phenol was substantially anhydrous.

| Expt. No. | Feed Analysis, p.p.m. | | Product Analysis, p.p.m. | |
|---|---|---|---|---|
| | Mesityl oxide | Other carbonyls | Mesityl oxide | Other carbonyls |
| 1 | 124 | 616 | 50 | 300 |
| 2 | 127 | 608 | 15 | 170 |

The product phenol from each experiment was distilled under the same conditions. The phenol thus obtained from experiment 1 was pink in colour (0.4 red, 0.1 yellow Lovibond units) while the phenol obtained from experiment 2 was practically colourless (0.1 red, 0.1 yellow Lovibond units). After 5 days storage in contact with air at 55° C. the distilled phenol from experiment 1 had a colour of 3.1 red and 12.5 yellow Lovibond units while that from experiment 2 had a colour of 1.0 red and 6.8 yellow Lovibond units.

In a similar series of experiments in which a refined phenol was passed under a pressure of 60 p.s.i.g. and at a liquid space velocity of 0.5 hrs.$^{-1}$ through the catalyst maintained at 200–210° C. the product analysis was as shown in the following table. In experiments 3 and 4 the phenol contained 2% by weight of water while in experiments 5 and 6 the phenol was anhydrous.

| Expt. No. | Mesityl oxide, p.p.m | 2-MBF, p.p.m | Other carbonyls, p.p.m | Chlorination colour index | Colour* Initial | Colour* After 5 days in air at 55 °C. |
|---|---|---|---|---|---|---|
| 3 | 20 | 332 | 98 | >1.5 | 0.2 | 0.5 |
| 4 | 25 | 294 | 140 | >1.5 | 0.2 | 0.5 |
| 5 | 11 | 64 | 15 | >1.5 | 0.2 | 0.2 |
| 6 | 3 | 27 | 20 | 0.9 | 0.2 | 0.2 |

* Colour in Lovibond units, red and yellow.

EXAMPLE 6

The following experiments demonstrate the effect of catalyst pore volume on the purification of phenol derived from cumene.

A substantially anhydrous refined phenol having a chlorination colour index of >1.5, a sulphonation colour index of >1.5 and containing less than 5 p.p.m. acetone, 31 p.p.m. mesityl oxide, 93 p.p.m. 2-methylbenzofuran and 50 p.p.m. of carbonyl compounds calculated as mesityl oxide was passed under a pressure of 125 p.s.i.g. through a reactor tube 48 inches long and 1.5 inches internal diameter packed with 1450 ml. of catalyst consisting of 90% silica and 10% alumina and maintained at a temperature of 240° C.

| Expt. No. | L.S.V., hr.$^{-1}$ | Catalyst pore volume, cc./g. | Acetone | Mesityl oxide | 2-MBF | Total Carbonyl* |
|---|---|---|---|---|---|---|
| 1 | 0.2 | 0.38 | <5 | <5 | 17 | 21 |
| 2 | 0.5 | 0.38 | <5 | <5 | 30 | 23 |
| 3 | 0.2 | 0.57 | <5 | <5 | 7 | 22 |
| 4 | 0.5 | 0.57 | <5 | <5 | 12 | 19 |

* Calculated as mesityl oxide.

The reduction in the 2-methylbenzofuran content of the phenol when using a catalyst of high pore volume is very marked.

The product phenol from Experiment 3 was frictionally distilled and a 0–95% fraction examined. It had a chlorination colour index of 0.2, a sulphonation colour of 0.3, a total carbonyl content of 6 p.p.m. and after storage at 55° C. for 15 days in contact with air and a stainless steel surface the colour of the phenol was only 0.1 yellow and nil red Lovibond units. When the phenol used as feed to the reactor was distilled in the same way the 0–95% fraction had substantially the same analysis as the undistilled feed.

EXAMPLE 7

The following experiments demonstrate the effect of liquid space velocity and the presence of chromium in the catalyst on the purification of phenol derived from cumene.

A refined substantially anhydrous phenol containing <5 p.p.m. acetone, 44 p.p.m. mesityl oxide, 69 p.p.m. 2-methylbenzofuran and 64 p.p.m. carbonyl compounds calculated as mesityl oxide was passed under a pressure of 120 p.s.i.g. through the packed reactor described in Example 4. In Experiments 6–12 inclusive the catalyst contained 0.3% chromium oxide. In all the experiments the product phenol contained <5 p.p.m. acetone and <5 p.p.m. mesityl oxide.

| Expt. No. | Temp., °C. | L.S.V., hr.$^{-1}$ | Product Analysis, p.p.m. 2-MBF | Product Analysis, p.p.m. Total carbonyl* |
|---|---|---|---|---|
| Catalyst containing no chromium oxide: | | | | |
| 1 | 210 | 0.1 | 19 | 26 |
| 2 | 210 | 0.2 | 25 | 25 |
| 3 | 210 | 0.5 | 37 | 23 |
| 4 | 260 | 0.1 | 10 | 38 |
| 5 | 260 | 0.2 | 16 | 30 |
| Catalyst containing chromium oxide: | | | | |
| 6 | 210 | 0.1 | 10 | 22 |
| 7 | 210 | 0.2 | 18 | 23 |
| 8 | 210 | 0.5 | 35 | 23 |
| 9 | 260 | 0.1 | 8 | 42 |
| 10 | 260 | 0.2 | 12 | 35 |
| 11 | 260 | 0.5 | 25 | 25 |
| 12 | 260 | 1.0 | 32 | 25 |

* Calculated as mesityl oxide.

Comparison of the product analyses shows that reduction in the liquid space velocity and the presence of chromium oxide facilitates the removal of 2-methylbenzofuran from phenol.

EXAMPLE 8

The following experiment demonstrates that only a very small loss of phenol occurs when operating according to the process of the invention.

A crude phenol derived from cumene was separated from lower boiling materials by distillation and passed at a L.S.V. of 0.2 hr.$^{-1}$ and a pressure of 120 p.s.i.g. through a reactor tube 48 inches long and 1.5 inches internal diameter packed with 1450 ml. of a catalyst consisting of 90% silica and 10% alumina which was maintained at a temperature of 240° C.

The total loss of phenol was 0.45% by weight.

What is claimed is:

1. A process for the purification of phenol obtained from the decomposition of cumene hydroperoxide and containing 2-methyl benzofuran, mesityl oxide, and other carbonyl compounds, comprising bringing the phenol which has been previously distilled to remove the low and high boiling materials into contact for up to 10 hours at a temperature between 180° and 260° C. and under a pressure sufficient to maintain the phenol in the liquid phase with a synthetic silica-alumina catalyst having 5 to 30% by weight of alumina and 95 to 70% by weight of silica and a pore volume within the range of 0.3 to 0.8 cc. per gram and having a surface area of from 100 to 500 square meter per gram under conditions such that the phenol contains less than 0.1% water, and separating the purified phenol from the catalyst.

2. A process as claimed in claim 1 in which the catalyst contains 0.01 to 5% by weight of a Group VI metal oxide selected from chromium, molybdenum and tungsten.

3. A process as claimed in claim 2 in which the catalyst contains about 0.3% by weight of chromium.

4. A process as claimed in claim 1 in which the contact time is within the range 4 to 8 hours.

References Cited

UNITED STATES PATENTS 2,910,511  10/1959  Jons.
3,029,294  4/1962  Keeble.
3,305,590  2/1967  Pollitzer et al.

FOREIGN PATENTS 920,864  3/1963  Great Britain.

DANIEL D. HORWITZ, Primary Examiner.

N. MORGENSTERN, Assistant Examiner.

U.S. Cl. X.R.

252—455, 453